United States Patent
Duguid et al.

(10) Patent No.: US 12,050,864 B1
(45) Date of Patent: Jul. 30, 2024

(54) SYSTEMS AND METHODS FOR A NEIGHBORHOOD VOICE ASSISTANT

(71) Applicant: Wells Fargo Bank, N.A., San Francisco, CA (US)

(72) Inventors: Margaret Duguid, Scottsdale, AZ (US); Chris Kalaboukis, San Jose, CA (US); Janet McClellan, Gilbert, AZ (US); Wendy Minkus, Phoenix, AZ (US); Robert M. Ronnau, Mesa, AZ (US); Donald Winans, Tempe, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 366 days.

(21) Appl. No.: 17/192,654

(22) Filed: Mar. 4, 2021

Related U.S. Application Data

(63) Continuation of application No. 15/885,058, filed on Jan. 31, 2018, now Pat. No. 10,943,603.

(51) Int. Cl.
| | |
|---|---|
| *G06F 40/20* | (2020.01) |
| *G06F 3/16* | (2006.01) |
| *G06F 16/9537* | (2019.01) |
| *G06Q 30/0282* | (2023.01) |
| *G10L 15/22* | (2006.01) |
| *G10L 15/26* | (2006.01) |
| *G10L 25/54* | (2013.01) |

(52) U.S. Cl.
CPC ............. *G06F 40/20* (2020.01); *G06F 3/167* (2013.01); *G06Q 30/0282* (2013.01); *G10L 15/22* (2013.01); *G10L 25/54* (2013.01); *G06F 16/9537* (2019.01); *G10L 15/26* (2013.01)

(58) Field of Classification Search
CPC ...... G06F 40/20; G06F 3/167; G06F 16/9537; G10L 15/22; G10L 15/26; G10L 25/54; G06Q 30/0282
See application file for complete search history.

(56) References Cited

U.S. PATENT DOCUMENTS

| | | | |
|---|---|---|---|
| 7,096,163 | B2 | 8/2006 | Reghetti |
| 7,245,925 | B2 | 7/2007 | Zellner |
| 7,606,713 | B2 | 10/2009 | Thorner |
| 8,589,164 | B1 | 11/2013 | Mengibar et al. |

(Continued)

*Primary Examiner* — Michelle M Koeth
(74) *Attorney, Agent, or Firm* — Foley & Lardner LLP

(57) ABSTRACT

A provider computing system includes a service recommendation database configured to retrievably store recommendation information, a network interface configured to communicate data over a network, and a processing circuit that includes a processor and memory. The memory is structured to store instructions that are executable by the processor and cause the processing circuit to receive a first set of recommendation information derived from a first set of voice data received by a local voice assistant and store the first set of recommendation information in the services recommendation database. The processing circuit is further caused to receive a request to generate a recommendation from a user voice assistant, derived from a second set of voice data received by the user voice assistant. The processing circuit is also caused to access the first set of recommendation information in response to the request and transmit the recommendation to the user voice assistant.

18 Claims, 7 Drawing Sheets

(56) References Cited

U.S. PATENT DOCUMENTS

| | | |
|---|---|---|
| 9,081,868 B2 | 7/2015 | Zhang et al. |
| 10,528,977 B1* | 1/2020 | Jogia ................... G06F 3/167 |
| 10,943,603 B2* | 3/2021 | Duguid ................ G06F 40/20 |
| 2007/0061335 A1 | 3/2007 | Ramer et al. |
| 2008/0159491 A1 | 7/2008 | Kelley et al. |
| 2009/0228280 A1 | 9/2009 | Oppenheim et al. |
| 2010/0030638 A1* | 2/2010 | Davis, III .......... G06Q 30/0254 |
| | | 709/204 |
| 2010/0049618 A1 | 2/2010 | Smith |
| 2012/0190386 A1 | 7/2012 | Anderson |
| 2013/0124189 A1* | 5/2013 | Baldwin ................ G06F 40/20 |
| | | 704/235 |
| 2013/0238461 A1 | 9/2013 | Tieken et al. |
| 2013/0275164 A1 | 10/2013 | Gruber et al. |
| 2013/0339345 A1* | 12/2013 | Soto Matamala .... G06F 16/248 |
| | | 707/722 |
| 2016/0261932 A1 | 9/2016 | Fadell et al. |
| 2017/0091612 A1* | 3/2017 | Gruber ................. G06F 3/0488 |
| 2017/0293610 A1* | 10/2017 | Tran ..................... G06Q 10/109 |
| 2017/0365008 A1 | 12/2017 | Schreier et al. |
| 2018/0211659 A1 | 7/2018 | Segal et al. |

\* cited by examiner

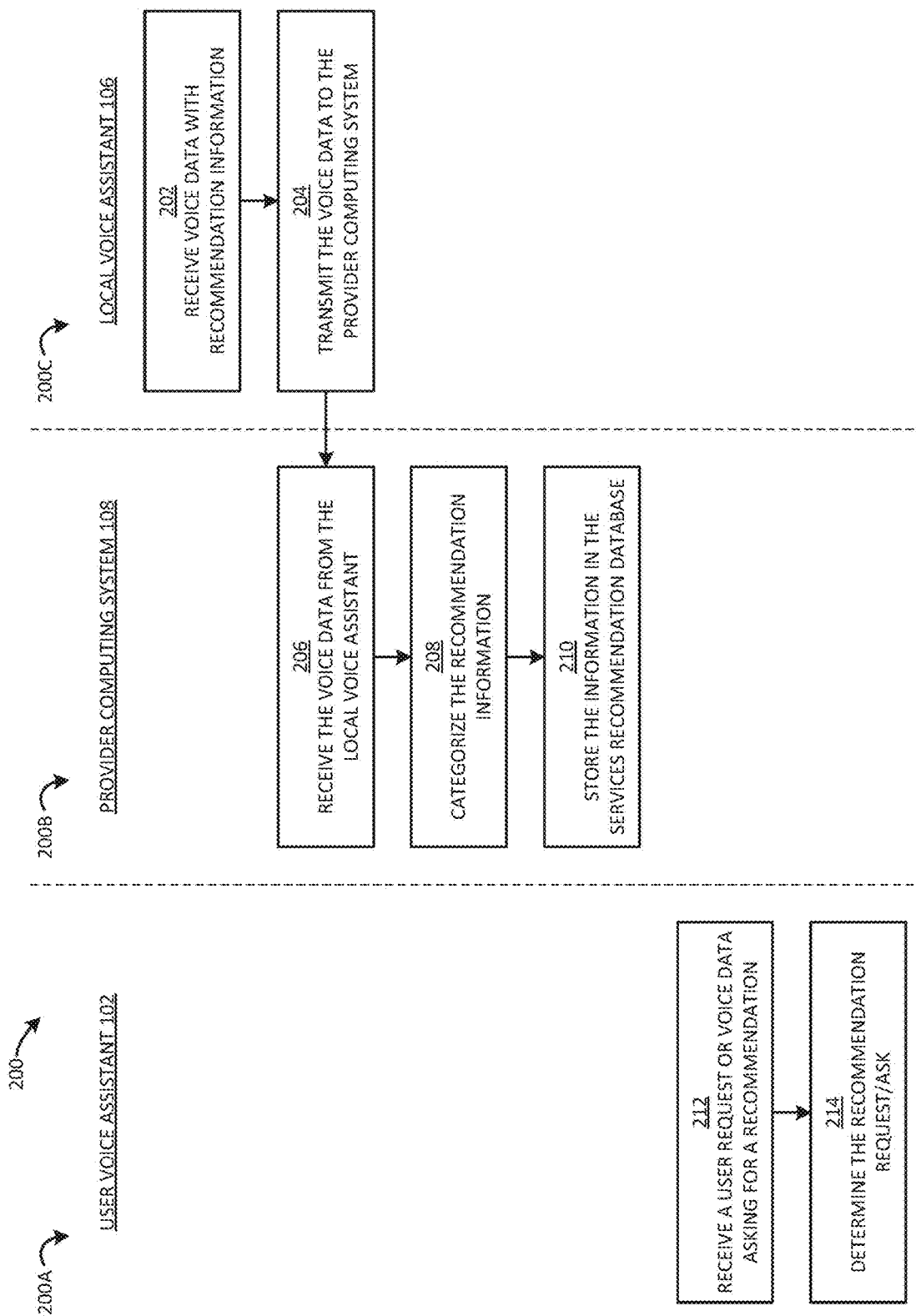

SYSTEMS AND METHODS FOR A NEIGHBORHOOD VOICE ASSISTANT

CROSS-REFERENCE TO RELATED PATENT APPLICATIONS

This application is a continuation of U.S. patent application Ser. No. 15/885,058 filed Jan. 31, 2018 and entitled "Systems and Methods for a Neighborhood Voice Assistant," which is incorporated herein by reference in its entirety.

TECHNICAL FIELD

Embodiments of the present disclosure relate generally to the field of voice assistants.

BACKGROUND

Certain services and information related to those services are particularly suited to being sourced from a local neighborhood. For example, residents of a neighborhood are often interested in recommendations for in-home, at-home, or neighborhood services such as lawn care, babysitting, plumbing, etc., and may trust such recommendations more if they come from fellow neighborhood residents. However, communication between neighbors that includes such recommendations or service-related information is often irregular, informal, and may not include socially-appropriate situations for giving or inquiring about service recommendations. Similarly, existing websites that attempt to provide neighborhood-based content require active, intentional, and time-consuming participation in posting and searching recommendation-related content.

SUMMARY

An exemplary embodiment of the present disclosure relates to a provider computing system. The provider computing system includes a service recommendation database configured to retrievably store recommendation information, a network interface configured to communicate data over a network, and a processing circuit that includes a processor and memory. The memory is structured to store instructions that are executable by the processor and cause the processing circuit to receive a first set of recommendation information from a local voice assistant and store the first set of recommendation information in the services recommendation database. The first set of recommendation information is derived from a first set of voice data received by the local voice assistant. The processing circuit is further caused to receive a request to generate a recommendation from a user voice assistant. The request is derived from a second set of voice data received by the user voice assistant. The processing circuit is also caused to access the first set of recommendation information in response to the request to generate the recommendation and transmit the recommendation to the user voice assistant.

Another exemplary embodiment relates to a method. The method includes receiving, by a provider computing system, a first set of recommendation information from a local voice assistant and storing the first set of recommendation information in a services recommendation database of the provider computing system. The first set of recommendation information is derived from a first set of voice data received by the local voice assistant. The method also includes receiving, by the provider computing system, a request to generate a recommendation from a user voice assistant. The request is derived from a second set of voice data received by the user voice assistant. The method further includes accessing, by the provider computing system, the first set of recommendation information in response to the request to generate the recommendation; and transmitting, by the provider computing system, the recommendation to the user voice assistant.

Another exemplary embodiment relates to a user voice assistant. The user interface includes an input/output device configured to record voice data spoken by a user in proximity to the user voice assistant, a network interface, and a processing circuit that includes a processor and a memory. The memory is structured to store instructions that are executable by the processor and cause the processor to receive the voice data from the input/output circuit, determine whether the voice data includes a request for a recommendation, and, in response to a determination that the voice data includes a request for a recommendation, send the request to a provider computing system, receive a recommendation from the provider computing system, and provide the recommendation to the input/output device to be presented to the user. The recommendation is based on neighborhood recommendation information derived from neighborhood voice data spoken by one or more neighbors in proximity to one or more local voice assistants.

These and other features, together with the organization and manner of operation thereof, will become apparent from the following detailed description when taken in conjunction with the accompanying drawings.

BRIEF DESCRIPTION OF THE DRAWINGS

FIGS. 2A and 2B are a flow diagram illustrating a process of providing neighborhood voice assistant services, according to an example embodiment.

DETAILED DESCRIPTION

Figure 1:
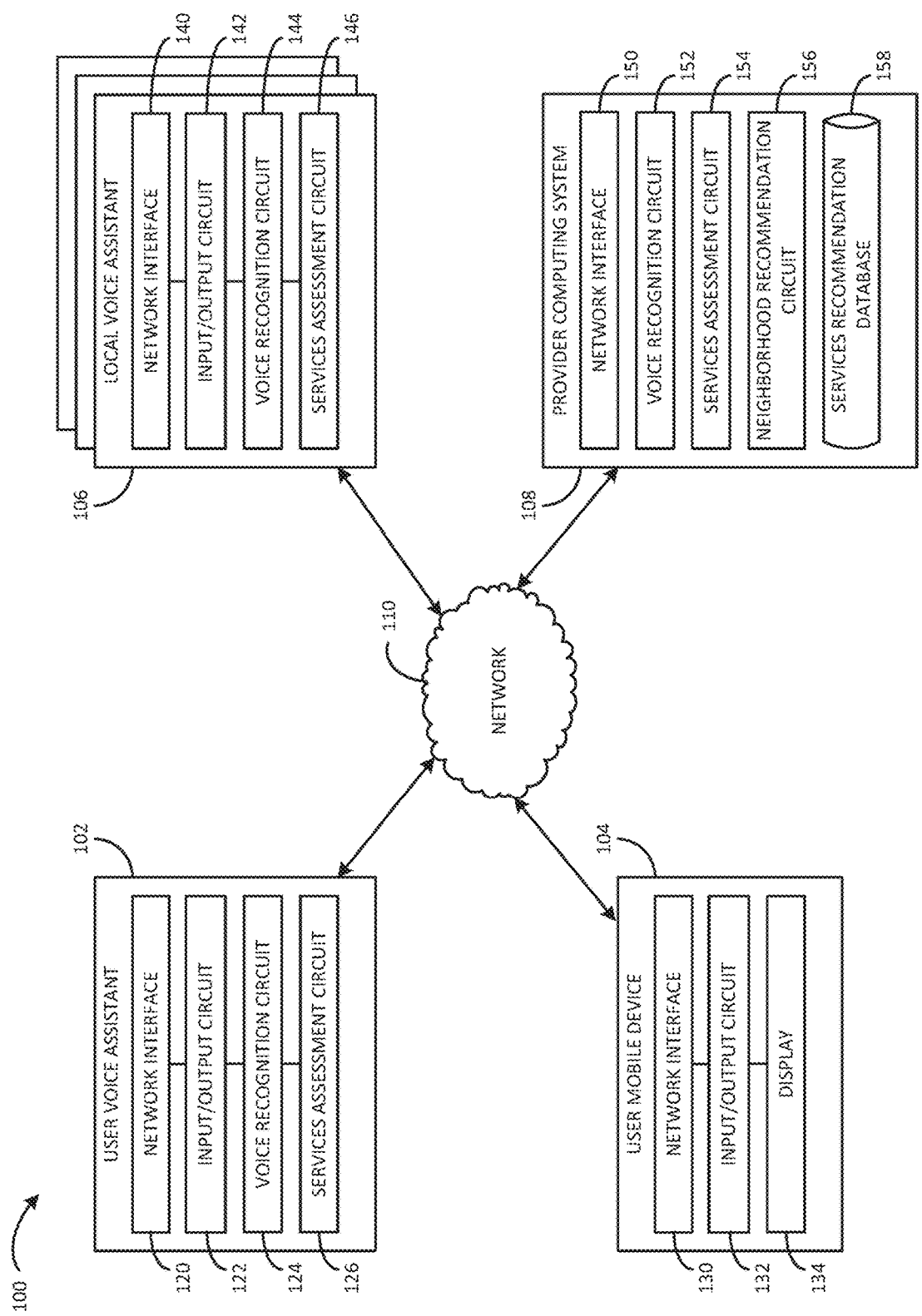
FIG. 1 is system for providing neighborhood voice assistant services, according to an example embodiment.

Referring to the Figures generally, various systems, methods, and apparatuses for providing neighborhood voice assistant services are described herein. In various embodiments, various users located in a neighborhood or community each own a voice assistant device. As used herein, the term "neighborhood" can include any definable area corresponding to a user's local area, including a preset or user-selectable distance from a user (e.g., one mile, ten miles), a school district, a school-assignment area (e.g., an area for which all public school students are sent to the same high school), a town, a city, a county, an area defined by geological features (e.g., hills, rivers, islands), roads, other landmarks, or some combination of those delineations.

A voice assistant device includes any device configured to perform tasks for the user in response to a voice command (e.g., an Echo® device, sold by Amazon®, running the Alexa® digital assistant). The voice assistant devices are networked together such that the voice assistant devices are configured to receive recommendations from some users and provide the recommendations to other users. As an example, a first user expresses near his voice assistant device that she is happy with services provided by a local plumber. A second user later expresses near her voice assistant device that she is in need of a plumber. In response, the second user's voice assistant device conveys to the second user that the local plumber is recommended by another user in her community.

The systems and methods described herein for providing neighborhood voice assistant services offer a number of technical advantages over current systems and methods for users to receive local goods and services recommendations. Currently, to receive local recommendations, users must either ask their neighbors or manually access applications or websites that, for example, allow various users to rate local businesses. However, to use such applications or websites, a user must specifically search for a good or service and sort through search results to find relevant recommendations. By contrast, one technical advantage of the present systems and methods is that a user's voice assistant device is configured to provide relevant recommendations directly to the user. Additionally, the voice assistant may provide relevant recommendations without the user needing to ask or search for them (e.g., based on information that the voice assistant device determines from the user's conversations near the voice assistant device).

Moreover, while a user may currently use a voice assistant device to find recommendations for local goods and services, the voice assistant device typically finds the recommendations using these same applications or websites. As such, the voice assistant device must currently access the application or website, search the application or website for the requested recommendation, determine which recommendation is best suited for the user (e.g., based on geography and the average review rating), and provide the recommendation to the user. Accordingly, the present systems and methods improve the functioning of a voice assistant device by simplifying the process of making recommendations. As an example, in one embodiment, a computing system to which the voice assistant device is networked stores local recommendation information received from a number of voice assistant devices. When the voice assistant device according to the present systems and methods determines that it should make a recommendation to the user, the voice assistant device accesses the computing system, receives a recommendation from the computing system, and provides the recommendation to the user. Thus, the voice assistant device is required to process less information in making the recommendation, thus requiring the processors of the voice assistant device to perform fewer actions. In turn, this may allow the user to receive the recommendation more quickly and improve the overall processing speed of the voice assistant device.

Referring now to FIG. 1, a system 100 for providing neighborhood voice assistant services is shown, according to an example embodiment. The system 100 includes a user voice assistant 102, a user mobile device 104, one or more local voice assistants 106, and a provider computing system 108 connected by a secure network (e.g., network 110).

Network 110 provides communicable and operative computing between the user voice assistant 102, the user mobile device 104, the one or more local voice assistants 106, and the provider computing system 108. In various embodiments, the network 110 includes any type or types of network, including wired (e.g., Ethernet) and/or wireless networks (e.g., 802.11X, ZigBee, Bluetooth, Internet, WiFi, etc.).

As described above, a user voice assistant 102 includes any device configured to perform tasks for a user in response to a voice command. Accordingly, in some embodiments, the user voice assistant 102 is a specific device configured specifically to be a voice assistant (e.g., an Echo® device sold by Amazon® running the Alexa® digital assistant, a specialized hardware module configured as described herein). In other embodiments, the user voice assistant 102 is a user device configured for other purposes but also capable of acting as a voice assistant (e.g., an iPhone®, sold by Apple Inc.®, running the Siri® digital assistant). In some embodiments, the user voice assistant 102 is integrated directly into the construction of homes or apartments (e.g., through computing elements, speakers, microphones, etc. distributed throughout a home, including in all homes/residences in a development project, apartment complex, subdivision, etc.).

The user voice assistant 102 is configured to receive voice data from a user relating to a request for a recommendation, determine the recommendation request, transmit the recommendation request to the provider computing system 108, receive a recommendation in response to the request from the provider computing system 108, and provide the recommendation to the user. Accordingly, the user voice assistant 102 includes a network interface 120, an input/output circuit 122, a voice recognition circuit 124, and a services assessment circuit 126.

As used herein, the term "request" or "recommendation request" can include an explicit ask for a recommendation (e.g., "Give me a recommendation"), and implicit statement of need for a recommendation (e.g., "I wish I knew a good plumber"), or a statement of a need for a service or of a problem that needs solving (e.g., "My toilet broke"; "We have a party to attend Saturday night" when one or more components of system 100 know that the speaker has a child that requires a babysitter). A request or recommendation request includes request criteria corresponding to the type of recommendation being requested, for example a type of service, a type of problem to be solved by a service, a schedule or time period of need for the service, a budget or cost expectation for the service, etc.

Network interface 120 includes program logic that facilitates connection of the user voice assistant 102 to the network 110. Accordingly, the network interface 120 supports communication via the network 110 between the user voice assistant 102 and the user mobile device 104, the local voice assistant 106, and the provider computing system 108. The network interface 120 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 120 includes cryptography capabilities to establish a secure or relatively secure communication session.

Input/output circuit 122 is structured to receive from and provide communication(s) to a user of the user voice assistant 102, such as a customer requesting a recommendation and a response from the user voice assistant 102 providing that recommendation. In this regard, the input/output circuit 122 is structured to exchange data, communications, instructions, etc. with input/output components of the user voice assistant 102. Accordingly, the input/output circuit 122 includes an input/output device, such as a microphone and speaker. In some arrangements, the input/output circuit includes a microphone or other listening device configured to constantly listen and record any voices and/or other sounds made in proximity to the user voice assistant 102. In some embodiments, the input/output device also includes a screen or display. The input/output circuit 122 also includes any combination of hardware components, communication circuitry, and machine-readable media for facilitating the exchange of information between the input/output device and components of the user voice assistant 102, such as voice recognition circuit 124, services assessment circuit 126, and network interface 120.

Voice recognition circuit 124 is configured to transcribe voice data (e.g., in an audio format as spoken by a user and received by input/output circuit 122) to a computer-readable format. Accordingly, the voice recognition circuit 124 is communicable with the input/output circuit 122 to receive raw voice data, for example as spoken by a user in proximity to the user voice assistant 102 and recorded by a microphone or other listening device of the input/output circuit 122. The voice recognition circuit 124 transforms the voice data into a format that can be utilized by computing components of the system 100, for example transcribing the voice data into human-readable words in alphanumeric characters and/or into computer-readable code components or data objects. The voice recognition circuit 124 may follow any voice recognition approach, for example based on hidden Markov models, dynamic time warping, neural networks, and/or end-to-end automatic speech recognition.

Services assessment circuit 126 is configured to process transcribed voice data to determine that the voice data includes a request for a recommendation and determine the characteristics of that request. According to various embodiments, the services assessment circuit 126 is configured to recognize several forms of requests for recommendations includes explicit requests/asks (e.g., "Voice Assistant, provide me with a recommendation for a plumber in my area;" "Voice Assistant, who is a good plumber in my neighborhood?"), recommendation-related remarks (e.g., the user is overheard mentioning to a friend that the user "has been looking for a good plumber"), and needs-related remarks (e.g., voice data includes a remark that the user's toilet is broken). The services assessment circuit 126 recognizes these types of statements in the transcribed voice data, and analyzes the recognized statements to extract information related to the category of good or service sought (e.g., plumber, babysitter, landscaping) and any other relevant information (e.g., the schedule when a babysitter is needed, the scope/scale of a plumbing or landscaping need). In some embodiments, the services assessment circuit 126 then communicates the extracted request information to the provider computing system 108.

According to various embodiments, the user mobile device 104 is configured to receive notifications from other elements of system 100 such as the user voice assistant 102 and the provider computing system 108, display a user interface that allows the user to view recommendations, make recommendations, review providers of goods or services, and/or contact recommenders and provider of goods and services. The user mobile device includes any type of mobile device operated by a user in connection with the services provided by system 100. As such, the mobile device 104 includes, but is not limited to, one or more of a phone (e.g., a smartphone or other cellular device), a computing device (e.g., a tablet, a portable gaming device, a laptop, a personal digital assistant), a wearable device (e.g., a smart watch, smart glasses, a smart bracelet, a virtual reality or augmented reality headset), and so on. Accordingly, the user mobile device 104 includes a network interface 130, an input/output circuit 132, and a display 134.

Network interface 130 includes program logic that facilitates connection of the user mobile device 104 to the network 110. Accordingly, the network interface 130 supports communication via the network 110 between the user mobile device 104 and the user voice assistant 102, the local voice assistant 106, and the provider computing system 108. The network interface 130 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 130 includes cryptography capabilities to establish a secure or relatively secure communication session.

The input/output circuit 132 is structured to receive from and provide communication(s) to a user of the user mobile device 104, such as a list of current recommendations and a request to contact a recommended service provider. In this regard, the input/output circuit 132 is structured to exchange data, communications, instructions, etc. with input/output components of the user mobile device 104, for example display 134. The input/output circuit 132 also includes any combination of hardware components, communication circuitry, and machine-readable media for facilitating the exchange of information between the input/output device and components of the user mobile device 104, such as network interface 130 and display 134.

In various embodiments, the display 134 is a screen, a touchscreen, a monitor, or other type of display. Display 134 is configured to display a user interface to communicate recommendation-related information to a user of the user mobile device 104. In some arrangements, the display 134 is also configured to receive communication from the user (e.g., through a keyboard provided on a touchscreen of the display 134). Accordingly, in certain arrangements, the display 124 is incorporated as an input/output device associated with the input/output circuit 122.

According to various arrangements, the local voice assistant 106 is an identical or similar device to user voice assistant 102, located at a dwelling or place of business in the same neighborhood as the user voice assistant 102. In some embodiments, multiple voice assistants located at multiple dwellings or places of business are included in system 100.

Local voice assistant 106 is configured to receive voice data with recommendation information and transmit the voice data with recommendation information to the provider computer system 108. In some embodiments, the local voice assistant 106 is also configured to transcribe the voice data to a computer-readable format and analyze the transcribed voice data to determine that the voice data includes information relating to a recommendation (e.g., a person near the local voice assistant 106 stated that he or she had a good experience with a plumber), and determine the nature of that recommendation, including the good or service (e.g., plumbing) and a rating/score (e.g., good, great, bad, 9/10, five stars). The local voice assistant 106 includes network interface 140, input/output circuit 142, voice recognition circuit 144, and services assessment circuit 146.

As used herein, "recommendation information" includes any statement or indication relating to the quality or reliability of a provider of a good or service or to the quality or reliability of the good or service provided by the provider, or other relevant information related to that provider or to a recommendation for that provider (e.g., cost, schedule, availability, contact instructions/information, particular expertise).

Network interface 140 includes program logic that facilitates connection of the local voice assistant 106 to the network 110. Accordingly, the network interface 140 supports communication via the network 110 between the local voice assistant 106 and the user mobile device 104, the user voice assistant 102, and the provider computing system 108. The network interface 140 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 140 includes cryptography capabilities to establish a secure or relatively secure communication session.

The input/output circuit 142 is structured to receive from and provide communication(s) to a user of the local voice assistant 106, such as a customer providing a recommendation to the local voice assistant 106. In this regard, the input/output circuit 142 is structured to exchange data, communications, instructions, etc. with input/output components of the user voice assistant 102. Accordingly, the input/output circuit 142 includes an input/output device, such as a microphone and speaker. In some arrangements, the input/output circuit includes a microphone or other listening device configured to constantly listen and record any voices and/or other sounds made in proximity to the user voice assistant 102. In some embodiments, the input/output device also includes a screen or display. The input/output circuit 142 also includes any combination of hardware components, communication circuitry, and machine-readable media for facilitating the exchange of information between the input/output device and components of the local voice assistant 106, such as voice recognition circuit 144, services assessment circuit 146, and network interface 140.

Voice recognition circuit 144 is configured to transcribe voice data (e.g., in an audio format as spoken by a user and received by input/output circuit 142) to a computer-readable format. Accordingly, the voice recognition circuit 144 is communicable with the input/output circuit 142 to receive raw voice data, for example as spoken by a user in proximity to the local voice assistant 106 and recorded by a microphone of the input/output circuit 142. The voice recognition circuit 144 transforms the voice data into a format that can be utilized by computing components of the system 100, for example transcribing the voice data into human-readable words in alphanumeric characters and/or into computer-readable code components or data objects. The voice recognition circuit 144 may follow any voice recognition approach, for example based on hidden Markov models, dynamic time warping, neural networks, and/or end-to-end automatic speech recognition.

The services assessment circuit 146 is configured to process the transcribed voice data to determine that the voice data includes a recommendation or other review of a provider of goods or services (e.g., a statement that a user would/does recommend a certain plumber, a comment that a certain plumber did a great job, a complaint that the plumber did a terrible job). In some embodiments, the services assessment circuit 126 recognizes these types of statements in the transcribed voice data and analyzes the recognized statements to extract information related to the category of good or service sought (e.g., plumber, babysitter, landscaping), a rating or score of the review (e.g., good, great, would recommend, would not recommend, 2/10, five stars), and any other relevant information (e.g., the schedule when a babysitter is available, the particular plumbing project that was well done). In some embodiments, the services assessment circuit then communicates the extracted recommendation information to the provider computing system 108. In some embodiments, some or all of the transcribing and processing steps described as being carried out by the local voice assistant 106 are additionally or alternatively carried out by the provider computing system 108.

In some embodiments, the services assessment circuit 146 provides the extracted recommendation information to the input/output circuit 142 to be presented to the recommender (i.e., the speaker whose voice was captured as voice data) for approval, disapproval, or revision before transmitting the recommendation information to the provider computing system 108. The input/output circuit 142 then provides the recommendation information to the recommender, for example by simulating a voice stating the recommendation information with a speaker of the input/output circuit 142. The recommender may then indicate revisions, additions, and/or edits to the recommendation information, and indicate whether or not the recommendation information should be provided to the provider computing system 108 via an input device of the input/output circuit 142.

The provider computing system 108 is configured to receive information relating to a recommendation, store the information, receive a request for a recommendation, search the stored information, and provide a recommendation to the user voice assistant 102 based on the stored information. In some embodiments, the provider computing system 108 is also configured receive raw voice data with information relating to a recommendation, transcribe the voice data to a computer-readable format, and determine recommendation-related information from the voice data. Accordingly, in those embodiments, the provider computing system 108 is configured to carry out some or all of the functions of the voice recognition circuit 124 and the services assessment circuit 126, and the voice recognition circuit 144 and the services assessment circuit 146. The provider computing system 108 includes a network interface 150, a voice recognition circuit 152, a services assessment circuit 154, a neighborhood recommendation circuit 156, and a services recommendation database 158.

The network interface 150 includes program logic that facilitates connection of the provider computing system 108 to the network 110. Accordingly, the network interface 150 supports communication via the network 110 between the provider computing system 108 and the user mobile device 104, the user voice assistant 102, and the local voice assistant 106. The network interface 140 may include a cable modem, a broadband modem, a cellular modem, a Bluetooth transceiver, a Bluetooth beacon, a radio-frequency identification (RFID) transceiver, and/or a near-field communication (NFC) transmitter. In some embodiments, the network interface 140 includes cryptography capabilities to establish a secure or relatively secure communication session.

The voice recognition circuit 152 is configured to transcribe voice data (e.g., in an audio format as spoken by a user and received by input/output circuit 142 or input/output circuit 122) to a computer-readable format, in addition to or as an alternative to the functions of voice recognition circuit 124 and voice recognition circuit 144. Accordingly, the voice recognition circuit 152 is communicable with the user voice assistant 102 and the local voice assistant 106 to receive raw voice data, for example as spoken by a user in proximity to the local voice assistant 106 and recorded by a microphone of the input/output circuit 142. The voice recognition circuit 152 transforms the voice data into a format that can be utilized by computing components of the system 100, for example transcribing the voice data into human-readable words in alphanumeric characters and/or into computer-readable code components or data objects. The voice recognition circuit 152 may follow any voice recognition approach, for example based on hidden Markov models, dynamic time warping, neural networks, and/or end-to-end automatic speech recognition.

The services assessment circuit 154 is configured to process the transcribed voice data to determine that the voice data includes a recommendation or other review of a provider of goods or services (e.g., a statement that a user would/does recommend a certain plumber, a comment that a certain plumber did a great job, a complaint that the plumber did a terrible job) or a request for a recommendation (e.g., an explicit request for a recommendation, a recommendation-related remark, or a needs-related remark). The services assessment circuit 154 recognizes these types of statements in the transcribed voice data and analyzes the recognized statements to extract information related to the category of good or service sought (e.g., plumber, babysitter, landscaping), a rating or score of the review or recommendation sought (e.g., good, great, would recommend, would not recommend, "a babysitter with a 4/10 rating is good enough"), and any other relevant information (e.g., the schedule when a babysitter is available, the particular plumbing project that was well done or is needed). If the voice data includes a request for a recommendation, the extracted information is provided to the neighborhood recommendation circuit 156, described below. If the extracted data is related to a review or recommendation made by a user, the services assessment circuit 154 stores the extracted information in the services recommendation database 158.

The services recommendation database 158 is configured to store recommendation-related information provided by the services assessment circuit 154, the local voice assistant 106 (e.g., the services assessment circuit 146 of the local voice assistant 106), the user voice assistant 102 (e.g., the services assessment circuit 126 of the user voice assistant 102), and/or the user mobile device 104. Accordingly, the services recommendation database 158 can include the names of providers of goods and services, one or more reviews and recommendations for each provider, the contact information for the providers, the names and contact information for reviewers and recommenders, and other relevant information. For example, other relevant information included in the services recommendation database 158 can include the availability of a person who holds him or herself out as a babysitter, where the availability information is based on data collected by the local voice assistant 106 located at the babysitter's dwelling (e.g., the babysitter tells the local voice assistant his/her schedule, the local voice assistant overhears a conversation about the babysitter's availability, the local voice assistant's usage history suggests that the babysitter is generally home and unoccupied on Tuesday evenings).

The neighborhood recommendation circuit 156 is configured to receive a request for a recommendation from the user voice assistant 102, search the services recommendation database 158 to determine a recommendation, and transmit the recommendation to the user voice assistant 102 via network interface 150 and network 110. The request for a recommendation received by the neighborhood recommendation circuit 156 contains request criteria including details of the request as extracted by services assessment circuit 126 and/or services assessment circuit 154, for example the category of service sought (e.g., plumbing, babysitting, landscaping), the schedule required (e.g., a babysitter for Saturday evening), a preferred trait of the provider (e.g., a poor review is acceptable if the price is cheap, a babysitter is a certain age or gender), or other extracted information included in the request. The neighborhood recommendation circuit 156 then searches the services recommendation database 158 for stored recommendation information that matches the request criteria.

If a provider is found in the service recommendation database 158 for which the recommendation(s)/review(s) and other stored information match or substantially match the request criteria, the neighborhood recommendation circuit 156 generates a recommendation of that provider to transmit to the user voice assistant 102. In a case where more than one provider matches the request criteria, the neighborhood recommendation circuit 156 may include all matches in a recommendation, include only the highest-rated or most-used provider, or prefer the inclusion of a provider recommended/reviewed by the neighbor with the closer relationship with the user of the user device 102 (e.g., determined by how often the user's voice is heard by the neighbor's local voice assistant 106; based on user-selectable preferred or trusted neighbors whose recommendations are weighted higher than others' recommendations). If no providers in the service recommendation database 158 match or substantially match the request criteria, the neighborhood recommendation circuit 156 may access external internet-based resources (e.g., Yelp, Angie's List) via network interface 150 to search for and download relevant recommendation information that matches the request criteria.

Figure 4:
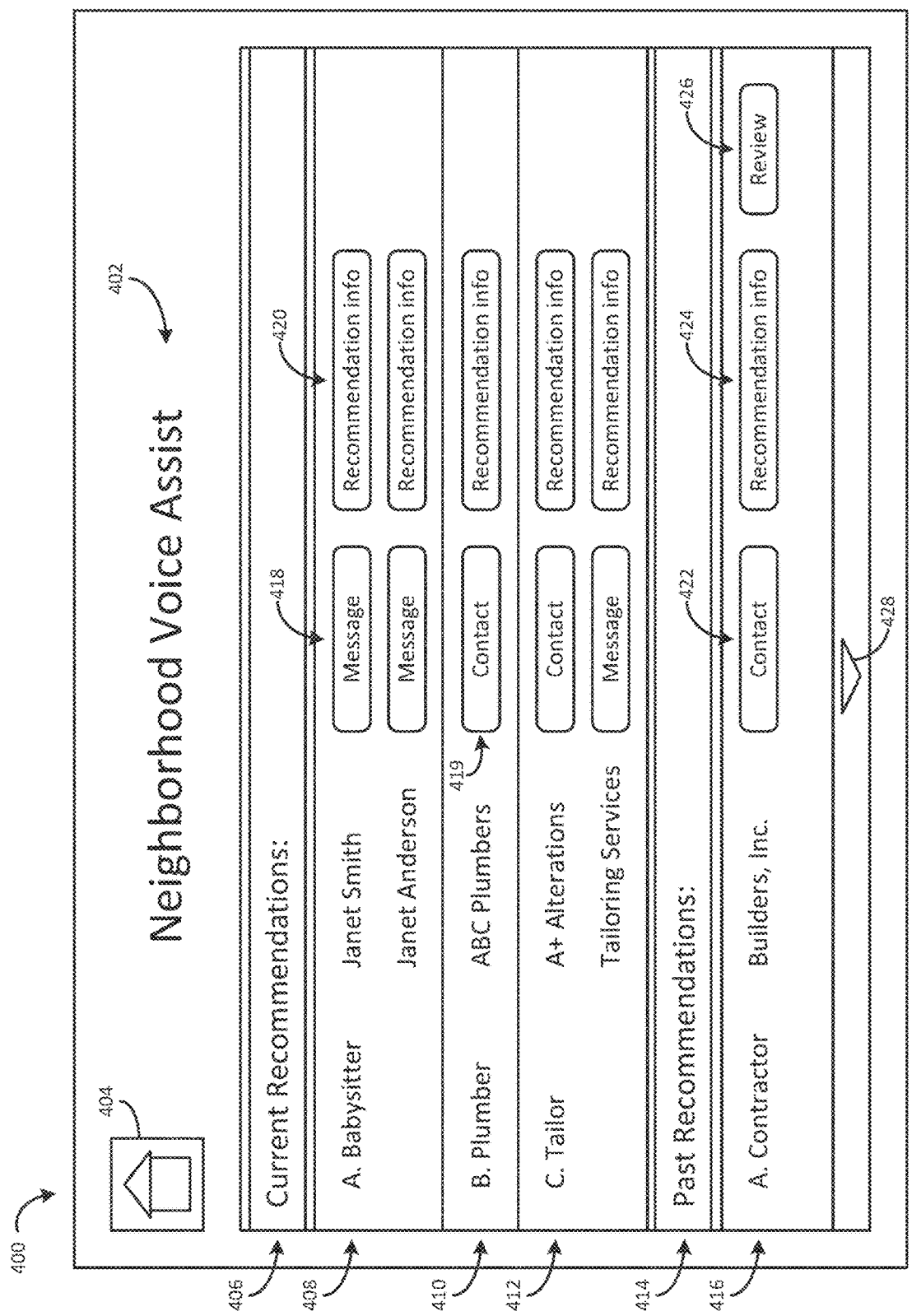
FIGS. 4-6 are graphical user interfaces shown to a user receiving neighborhood voice assistant services.
Figure 5:
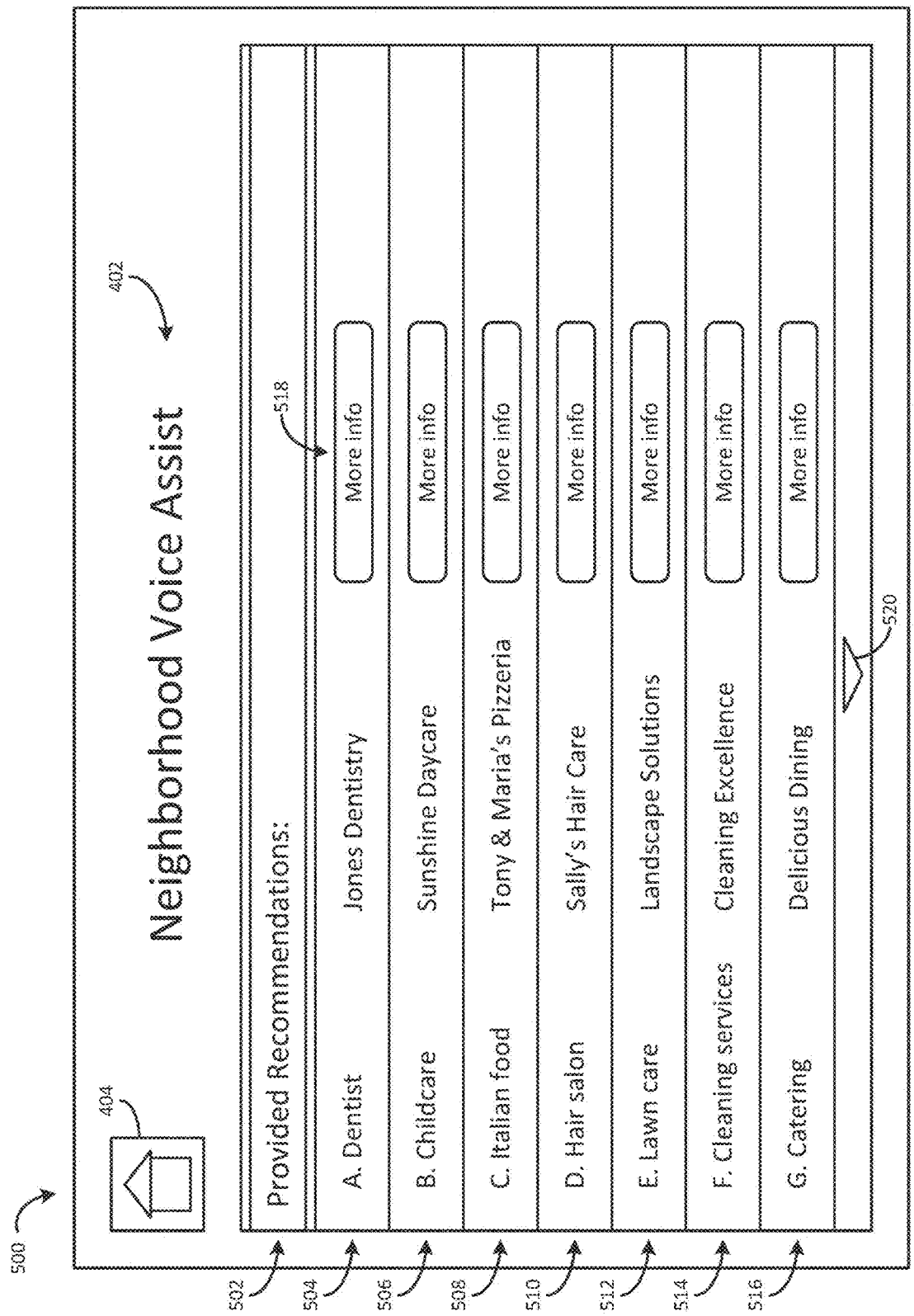
Figure 6:
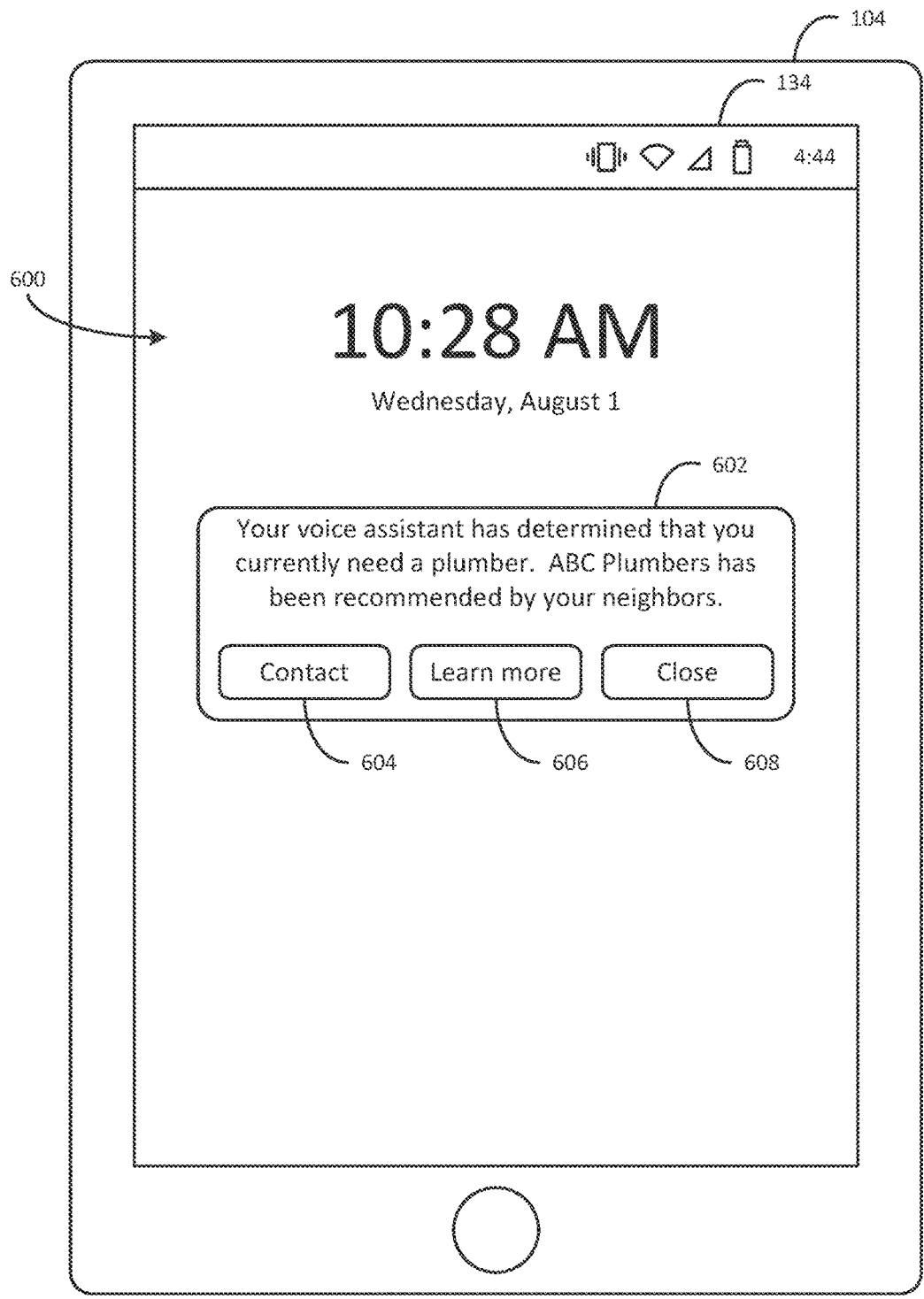

The recommendation generated by the neighborhood recommendation circuit 156 can then be communicated to a user via the input/output circuit 122 (e.g., via a speaker of an input/output device). In some embodiments, the recommendation generated by the neighborhood recommendation circuit 156 is transmitted to the user mobile device 104 for presentation on display 134. The recommendation may include the name of the recommended provider, information corresponding to the content of a recommendation or review made by a neighbor using local voice assistant 106, and the name of the recommender or reviewer. The recommendation may be accompanied by an option to contact the recommender, provided via a display (e.g., display 134) or via a voice prompt from user voice assistant 102. Several user interfaces for communicating recommendations and other information to a user are shown in FIGS. 4-6 and described below.

In some embodiments, the system 100 is configured to maintain privacy between individuals who choose not to identify that they were the source of the recommendation. In such embodiments, a recommender (i.e., a user of a local voice assistant 106) can select to have some or all of the recommender's recommendations be anonymized and stored anonymously in the services recommendation database 158 to protect the recommender's privacy. The recommender can select to anonymize particular recommendations or can request anonymization for all recommendation information provided by the recommender. In such a case, the recommendation provided to a user of the user voice assistant 102 does not contain information about the recommender, and may indicate that the recommendation was made anonymously. In some embodiments, the system 100 is structured so that all recommendation information is processed and stored anonymously throughout the system 100 (i.e., in the user voice assistant 102, the user mobile device 104, the local voice assistants 106 and the provider computing system 108) to ensure anonymity and comply with applicable data protection and privacy laws.

Figure 2B:
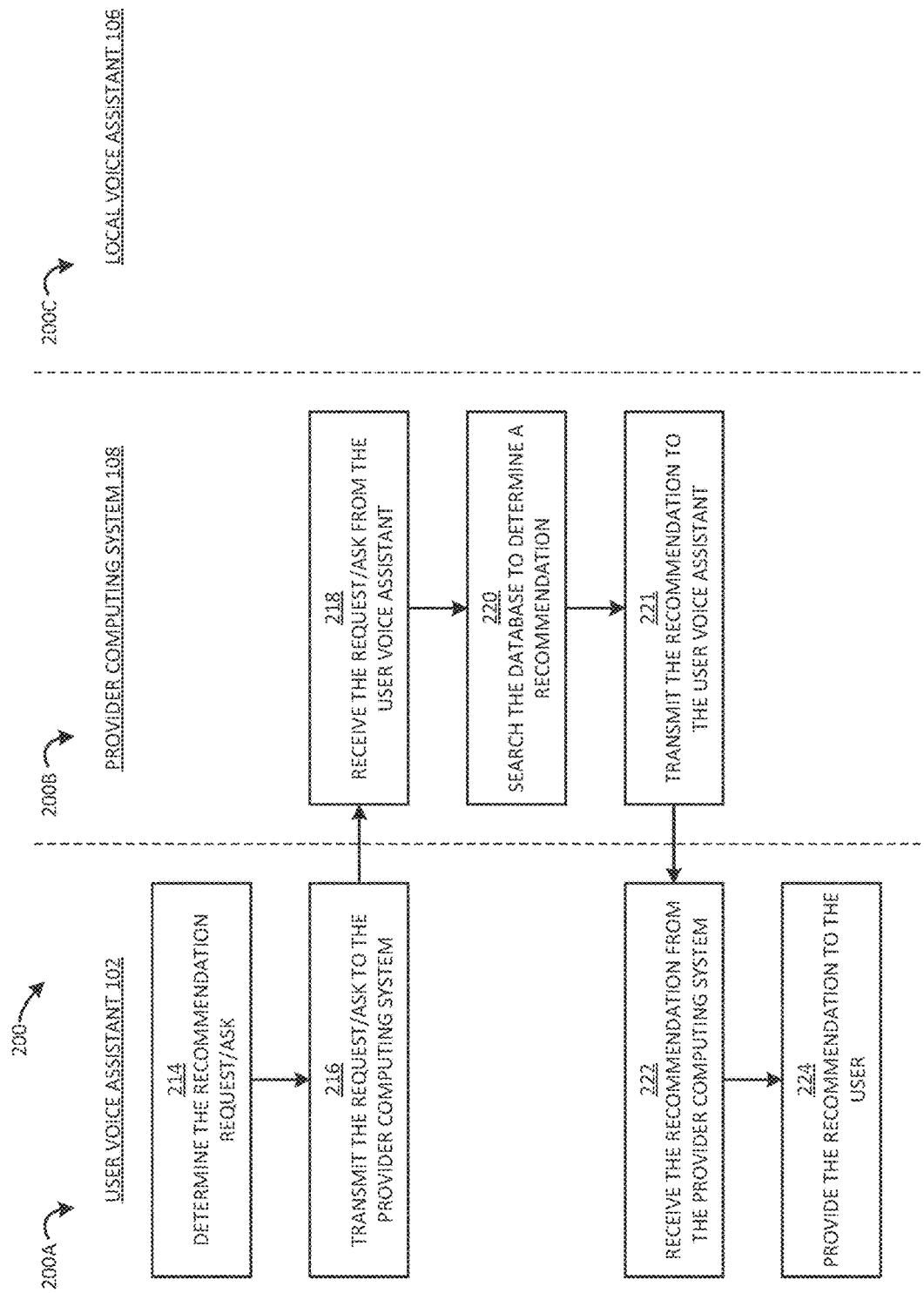

Referring now to FIG. 2A-B, a process 200 of providing neighborhood voice assistant services is shown, according to an example embodiment. FIG. 2B is a continuation of the process 200 shown in FIG. 2A. Process 200 can be carried out by the system 100 of FIG. 1. More particularly, the process 200 is depicted in a flowchart organized by the component of system 100 that carries out each step, with the user voice assistant 102 carrying out process 200A, the provider computing system 108 carrying out process 200B, and local voice assistant 106 carrying out process 200C.

At step 202, the local voice assistant 106 receives voice data that contains recommendation information. In some embodiments, the input/output circuit 142 receives the voice data by sensing and recording words spoken by a person in the vicinity of the local voice assistant 106. Accordingly, in some embodiments, the voice data is an audio recording of a neighbor speaking in proximity to the local voice assistant 106 sensed by a microphone of the input/output circuit 142. In some embodiments, the local voice assistant 106 constantly receives all audio or all voice-like audio that can be picked up by a microphone or other listening devices of the input/output circuit 142, some portion of which contains recommendation information. Recommendation information includes any statement or indication relating to the quality or reliability of a provider of a good or service or to the quality or reliability of the good or service provided by the provider.

At step 204, the local voice assistant 104 transmits the voice data to the provider computing system 106 via network 110. In some arrangements, the services assessment circuit 146 transmits the voice data in coordination with the network interface 140. In some embodiments, the transmitted voice data is the audio recording as collected by a microphone of input/output circuit 142. In other embodiments, the audio recording is processed by the local voice assistant, for example in voice recognition circuit 144 and services assessment circuit 146, to convert the audio recording to text or computer-readable characters and extract recommendation information from the audio recording, and transmit the extracted recommendation information as part of the voice data that the local voice assistant 104 transmits to the provider computing system 106 at step 204.

At step 206, the provider computing system 108 receives the voice data from the local voice assistant 106. In various arrangements, the voice data is received by the voice recognition circuit 152 and/or the services assessment circuit via network interface 150. As mentioned above, the voice data contains an audio recording, a file of text or computer-readable characters resulting from the application of voice recognition, and/or extracted recommendation information. The provider computing system 108 may also conduct voice recognition and recommendation information extraction processes upon receipt of the voice data in step 206.

At step 208, the provider computing system 108 categorizes the recommendation information. In other words, the provider computing systems 108 determines whether a portion of the recommendation information corresponds to a name of a provider of a good or service (e.g., a plumber or babysitter) a rating or approval/disapproval of that provider (e.g., "She's a great plumber," "He's a great babysitter"), or other category of information. In some arrangements, the services assessment circuit 154 categorizes the recommendation information. In some arrangements, the provider computing system 108 also checks the services recommendation database 158 to check whether previous information has been stored related to the named provider, in order to categorize the new recommendation as corresponding to an existing provider in the services recommendation database 158.

At step 210, the recommendation information is stored in the services recommendation database 158. In some arrangements, the services assessment circuit 156 stores the recommendation information in the services recommendation database 158. According to various embodiments, information stored in the services recommendation database is organized by or includes the provider name, the category of service, the quality of the provider (e.g., whether the provider should be recommended to a user or not), the location of provider, the provider's availability, and the location of the local voice assistant 106 that was the source of the recommendation information.

At step 212, the user voice assistant 102 receives a user request or voice data asking for a recommendation. According to some embodiments, a user request and/or voice data is received by the input/output circuit 122 of the user voice assistant 102. In some embodiments, a user request can include an input directly asking for a recommendation, for example made by a user via the display 134 of user mobile device 104 and transmitted from the user mobile device 104 to the user voice assistant 102 via network 110. Voice data asking for a recommendation includes audio recordings as captured by a microphone of the input/output circuit 122, and may include an explicit ask for a recommendation (e.g., "Give me a recommendation"), and implicit statement of need for a recommendation (e.g., "I wish I knew a good plumber"), or a statement of a need for a service or of a problem that needs solving (e.g., "My toilet broke," and "We have a party to attend Saturday night" when one or more components of system 100 know that the speaker has a child that requires a babysitter).

At step 214, the user voice assistant 102 determines the recommendation request/ask. That is, the user voice assistant 102 processes the user request or the voice data to determine request/ask criteria such as the good or service sought by the user and any other relevant criteria or limitations of the request/ask (e.g., availability, specialties). For example, the user voice assistant 102 may determine that the user needs a babysitter on a Thursday night from 7:00 to 10:00 P.M. and that the babysitter must be recommended as good at handling multiple boys at once. The determination of step 214 includes voice recognition (e.g., speech recognition), for example carried out by voice recognition circuit 124, and a processing of the recognized words and phrases to determine the recommendation request/ask, for example carried out by services assessment circuit 126.

At step 216, the user voice assistant 102 transmits the request/ask (e.g., a list of criteria which define the request/ask) to the provider computing system via network 110. According to some embodiments, the services assessment circuit 126 transmits the request/ask via the network interface 120. The provider computing system 108 receives the request/ask from the user voice assistant 102 at step 218, for example with the neighborhood recommendation circuit 156 via network interface 150.

At step 220, the provider computing system 108 searches the services recommendation database 158 to determine a recommendation. In some embodiments, the neighborhood recommendation circuit searches the services recommendation database 158 to determine a recommendation. The search involves applying the criteria of the request/ask to filter through recommendations and provider information stored in the services recommendation database 158 to locate one or more providers/recommendations that match the criteria. According to some arrangements, if no matching recommendations are found, the provider computing system 108 searches for recommendations/providers that are close to the criteria (i.e., meet some but not all of the limitations), proceeds to transmit a message to the user voice assistant 102 or user mobile device 104 that no recommendation could be found, or stops there. In some embodiments, if more than one provider is located that matches the criteria of the request/ask, the provider computing system can provide all matches to the user via user voice assistant 102 or determine a best match based on predefined user preferences, a relationship between a recommender and the user, an advertising payment made to the operator of the provider computing system by one of the providers, or some other data point or points and provide the best match to the user via user voice assistant 102.

At step 221 the provider computing system 108 transmits the recommendation to the user voice assistant 104. In some embodiments, the provider computing system 108 alternatively or additionally transmits the recommendation to the user mobile device 104 via network 110. According to some embodiments, the recommendation is transmitted by the neighborhood recommendation circuit 156 via the network interface 150 and network 110.

At step 222, the user voice assistant 102 receives the recommendation from the provider computing system 108. In some embodiments, the recommendation is received by the input/output circuit 122 via network interface 120. The recommendation may be in the form of an audio file that can be played by a speaker of input/output circuit 122, or may be in another format that must converted to an audio format by the user voice assistant to be played as a series of sounds by the input/output circuit 122. In some embodiments, the recommendation is in another data format that may be presented on a graphical user interface, for example as shown in FIGS. 4-6.

At step 224, the user voice assistant 102 provides the recommendation to the user. As alluded to above, providing the recommendation to the user includes, in some embodiments, playing a series of noises via a speaker of input/output circuit 122 to create the sound of a human-like voice stating the recommendation. In other embodiments, recommendations are provided on a graphical user interface presented on a display included as input/output device of input/output circuit 122, for example as shown in FIGS. 4-5. In some embodiments, a graphical user interface is also provided for the user mobile device 104 that presents the recommendation.

Figure 3:
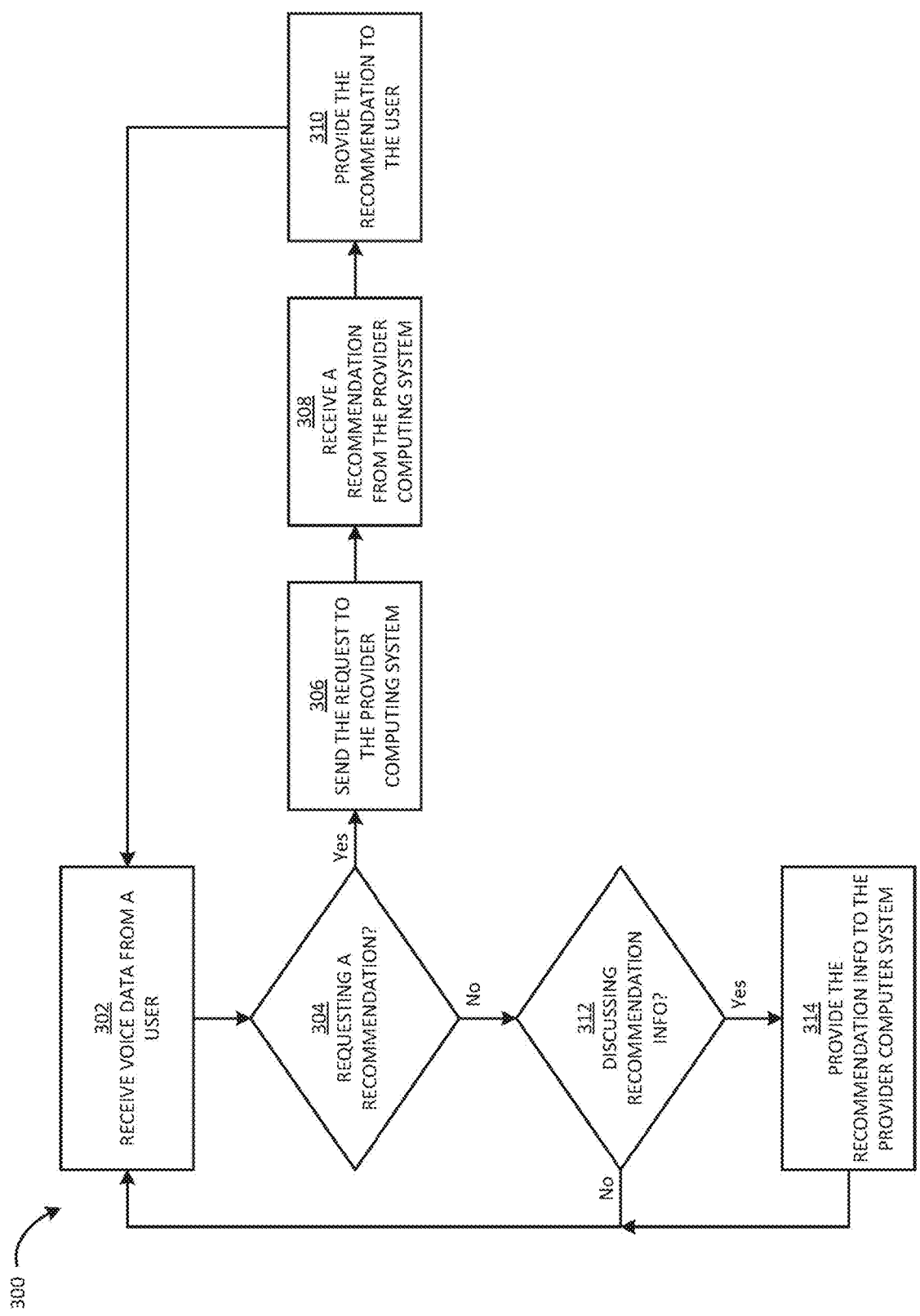
FIG. 3 is a flow diagram illustrating a process of providing neighborhood voice assistant services, according to an example embodiment.

Referring now to FIG. 3, a flow diagram illustrating a process 300 of providing neighborhood voice assistant services is shown, according to an example embodiment. Process 300 can be carried out, for example, by the user voice assistant 102 or the local voice assistant 106 in communication with the provider computing system 108. For the sake of clarity in the following description, reference is made to the user voice assistant 102 carrying out the steps of process 300.

At step 302, the user voice assistant 102 receives voice data from a user. According to some arrangements, voice data is received by the user voice assistant 102 via a microphone or other listening device of input/output circuit 122 that senses and records the sound of the user's voice. Voice data received by the user voice assistant 102 can include any vocalization of the user or other people in proximity to the user voice assistant 102 (i.e., such that the person's voice can be picked up by a microphone or other listening device of the user voice assistant 102). In such cases, voice data includes a wide variety of content, much of which is unrelated to making a recommendation or requesting a recommendation.

At step 304, the user voice assistant 102 determines whether or not the voice data received at step 302 includes a request for a recommendation. Making this determination involves speech recognition, for example by the voice recognition circuit 124, to transcribe the voice data into alphanumeric text (e.g., in English) or some computer-readable language that can be processed to determine the subject matter of the speech captured in the voice data. The transcribed voice data is then analyzed, for example by the services assessment circuit 126 using a natural language processing approach, to determine whether the voice data includes recommendation-related content. In some embodiments, this determination involves a search of the transcribed voice data for recommendation-related keywords (e.g., "recommend," "recommendation," "review"), provider-related names or keywords (e.g., "Bob Plumber," "electrician"), or needs-related keywords (e.g., "broken toilet," "dirty carpets"). The system 100 may apply a learning algorithm to voice data received by the user voice assistant 102 and the local voice assistant 106 to improve the automated recognition of recommendation-related voice data over time. Recognition of a request for a recommendation in step 304 includes differentiating a request for a recommendation from an statement that makes a recommendation (see step 312 discussed below).

If the user voice assistant 102 determines that a request includes a recommendation, the request is sent to the provider computing system 108 at step 306. According to various embodiments, the request sent includes the voice data, the transcription of the voice data (e.g., English text), and/or request criteria extracted from the voice data by the user voice assistant 102). In some embodiments, the request is sent by the services assessment circuit 126 via network interface 120. The request is received and processed by the provider computing system 108, for example as described with reference to FIG. 2.

At step 308, the user voice assistant 102 receives a recommendation from the provider computer system 306, responsive to the request sent in step 306. In some embodiments, the recommendation is received by the input/output circuit 122 via network interface 120. According to various embodiments, the recommendation includes the name of a recommended service provider, the name of the recommender (e.g., the neighbor who recommended the service provider), and/or other details about the provider or the recommendation such as the availability/schedule of the service provider, the location of the provider, contact information for the provider and/or the recommender, and details about the service provided to the recommender.

At step 310, the user voice assistant 102 provides the recommendation to the user. In some embodiments, the recommendation is provided by playing the sound of a human-like voice stating the recommendation in natural language (e.g., English semantic sentences) using a speaker of the input/output circuit 122. In some embodiments, the recommendation is provided by displaying the recommendation on a display of the input/output circuit 122, for example as shown in FIGS. 4-5. After, the user voice assistant 102 provides the recommendation to the user, the user voice assistant 102 returns to a listening state where it can receive voice data in step 302.

If, in step 304, the user voice assistant 102 determines that the voice data does not include a request for a recommendation, process 300 moves on to step 312 where the user voice assistant 102 determines whether or not the voice data includes a discussion of recommendation information. Discussion of recommendation information includes explicit recommendations (e.g., "I recommend Bob Plumber"), implicit recommendations (e.g., "Bob Plumber did a great job," "Thanks Joe, my carpet is really clean now!"), and other provider-related information (e.g., "My daughter is a babysitter and she is available on Saturday night"). Step 312 thus includes processing the voice data to recognize such discussions and, where recognized, extract the recommendation information, for example using a natural language processing approach and a machine learning algorithm by the services assessment circuit 126.

If the user voice assistant determines that the voice data includes recommendation information, in step 314 the recommendation information extracted from the voice data is provided to the provider computing system 108 via network 110. According to some embodiments, the services assessment circuit 126 transmits the recommendation information to the provider computer system 108 in coordination with network interface 120. In some embodiments, the user is made aware that the user voice assistant 102 is transmitting the user's recommendation to the provider computer system 108, and may be asked for permission by the user voice assistant 102 or may be prompted for more related recommendation information, while in other embodiments the user is not made aware that the user's statement is being used to populate the services recommendation database 158 of the provider computing system 108.

After the recommendation information is provided to the provider computing system 108 in step 314, the user voice assistant 102 is ready to receive more voice data from a user in step 302. If, in step 312, the user voice assistant determines that the voice data does not include a discussion of recommendation information, then the user voice assistant 102 is prepared to receive more voice data from a user in step 302. Thus, as shown in FIG. 3, the user voice assistant 102 repeatedly listens for and receives voice data from a user, determines whether the request includes a recommendation or a discussion of recommendation information, transmits the request or the recommendation information to the provider computing system, and, if the voice data includes a request, receives a recommendation in response and provides the recommendation to the user.

Referring now to FIGS. 4-6, graphical user interfaces shown to a user receiving neighborhood voice assistant services are shown, according to example embodiments. FIG. 4 shows a recommendations received view 400, which can be displayed on a display of the input/output circuit 122 of the user voice assistant 102 and/or the display 134 of the user mobile device 104. In general, recommendations received view 400 includes current recommendations received for the user by the user voice assistant 102 as well as past recommendations (i.e., recommendations that the user followed by hiring the recommended service provider) and options to access further information. More particularly, recommendations received view 400 as shown in FIG. 4 includes title 402, home button 404, current recommendations widget 406, current recommendations 408-412, past recommendations widget 414, past recommendation 416, message button 418, contact button 419, recommendation information button 420, contact button 422, recommendation information button 424, review button 426, and view more button 428.

Title 402 indicates that the recommendations received view 400 is related to a neighborhood voice assistance service and the user voice assistant 102. In some embodiments, title 402 includes the name of the neighborhood from which the recommendations displayed on recommendations received view 400 are pulled (e.g., a school district, a high school's assigned region, a name of a major intersection or landmark in the neighborhood, a ward or voting district, a well-known neighborhood name). Home button 404 is configured to be selected by a user (e.g., touched on a touch-screen display, clicked with a mouse and cursor, voice command to select the button) to navigate away from the recommendations received view 400 to a home screen (not shown).

Current recommendations widget 406 includes a list of current recommendations. Current recommendations are recommendations sent to the user voice assistant 102 and provided to the user, for example as in step 308 and step 310 of FIG. 3, that the user has not yet followed or deleted. As shown in FIG. 4, the current recommendations widget includes babysitter recommendations for two babysitters ("Janet Smith" and "Janet Anderson"), a plumber recommendation 410 for "ABC Plumbers," and tailor recommendations 412 for two tailors ("A+ Alterations" and "Tailoring Services"). Each current recommendation includes a message button 418 or a contact button 422, and a recommendation information button 420.

Message button 418 is listed next to "Janet Smith" and can be selected by the user to send a message to "Janet Smith" within the system 100. That is, "Janet Smith" is a user of a local voice assistant 106, such that a message can be sent from the user's user voice assistant 102 to the local voice assistant 106 used by "Janet Smith" via network 110. According to various embodiments, a message can be a recorded audio message (e.g., a voicemail), a text-based message, a real-time voice chat, or any other communication format.

Contact button 419 is listed alongside "ABC Plumbers" and can be selected by the user to contact "ABC Plumbers." Contact button 419 indicates that "ABC Plumbers" is not a user of a local voice assistant 106, such that contact must be made using some other form of communication, such as a telephone call to a device outside of system 100. In response to a selection of contact button 419, the user voice assistant 102 may be configured to make a telephone call to a telephone number associated with "ABC Plumbers," forward that number to user mobile device 104 such that the phone call can be made on the user mobile device 104, or display a phone number or other contact information for the user to read and apply with a different device such as a telephone. Other forms of communication are also possible, such as email, SMS text messaging, and third-party messaging applications.

Recommendation information button 420 is configured to be selected by a user to view recommendation information related to the recommended service provider (e.g., "Janet Smith"). In some embodiments, a recommendation information view is launched in response to a selection of recommendation information button 420 that shows the name of the recommender, contact information for the recommender, a history of neighbors who have used the service provider, a profile of the service provider, the service provider's schedule/availability, and other relevant recommendation information. In some embodiments, the user voice assistant 102 uses a speaker to communicate the recommendation information to the user in an audio form.

Past recommendations widget 414 includes past recommendations, which are recommendations that the user followed by hiring the recommended service provider. For example, FIG. 4 shows that the user used a recommended contractor 416 "Builders, Inc.". In addition to contact button 422 and recommendation information button 424 that have the same or similar functions as contact button 419 and recommendation information button 420 discussed above, the past recommendations widget 414 includes review button 426. Selecting review button 426 launches a review view that prompts the user to review (e.g., rate, leave comments, answer questions about) the service provider. User review input is then transmitted to the provider computer system 108 to be saved in the services recommendation database 158.

View more button 428 may be selected to scroll the recommendations received view 400 down to view more current recommendations and/or past recommendations.

FIG. 5 shows a recommendations provided view 500 that shows recommendations provided to the system 100 by the user. As described with reference to steps 202-210 of FIG. 2A and steps 312-314 of FIG. 3, for example, recommendations may be provided to the system by a user via user voice assistant 102 and local voice assistant 106 by discussing (e.g., speaking, vocalizing) recommendation information near a user voice assistant 102 or a local voice assistant 106. In some embodiments, recommendations are tagged as provided by a user if found in voice data from the user voice assistant 102 belonging to that user. In some cases, a first user of the user voice assistant 102 visits a neighbor who has a local voice assistant 106 and discusses recommendation information, such that voice data is received by the neighbor's local voice assistant 106. In such a case the local voice assistant 106 or the provider computing system 108 may conduct a voice identification analysis to determine that the first user was the speaker that made a recommendation and label that recommendation as made by the first user even though the voice data was received by the neighbor's local voice assistant 106. Recommendations made by a particular user can then be identified and aggregated for presentation on a graphical user interface as in recommendations provided view 500.

Recommendations provided view 500 includes title 402, home button 404, provided recommendations widget 502, provided recommendations 504-516, more information buttons 518, and view more button 520. As in recommendations received view 400, title 402 indicates that the recommendations received view 400 is related to a neighborhood voice assistance service and the user voice assistant 102. Home button 404 is configured to be selected by a user (e.g., touched on a touchscreen display, clicked with a mouse and cursor, voice command to select the button) to navigate away from the recommendations received view 400 to a home screen (not shown). The home screen, in some embodiments, provides a way for a user to navigate from the recommendations received view 400 to the recommendations provided view 500.

Provided recommendations widget 502 is populated with a list of recommendations made by the user to the system 100. Provided recommendations widget 502 allows a user to view the recommendations made by the user, including, in some cases, recommendations that the user was unaware that the user voice assistant 102 overheard and/or interpreted as recommendations. In some embodiments, the provided recommendations widget 504 allows the user to review, edit, delete, clarify, or otherwise modify the provided recommendations. As shown in FIG. 5, the provided recommendations widget 502 includes a dentist recommendation 504 endorsing a dentistry office called "Jones Dentistry," a childcare recommendation 506 for a provider "Sunshine Daycare," an Italian food recommendation 508 endorsing "Tony & Maria's Pizzeria," a hair salon recommendation 110 endorsing "Sally's Hair Care," a lawn care recommendation 512 endorsing "Landscape Solutions" a cleaning services recommendation 514 endorsing "Cleaning Excellence," and a catering recommendation 516 endorsing "Delicious Dining." Recommendations 504-516 may be organized in any suitable manner, for example alphabetically by service or provider name or chronologically by creation time.

Each recommendation 504-516 includes a more information button 518. More information button 518 is configured to be selected by a user to request more information about the corresponding recommendation. The recommendations provided view 500 provides more information in response to a user request for more information made via more information button 518. The more information might include a date and time of recommendation creation, a textual transcription of the voice data that includes the recommendation, contact information or other information about the recommended provider. In some embodiments, a pop-up, widget, view, or other interface showing the more information also includes an option for the user to edit the information and/or delete the recommendation from the list in the provided recommendations widget 502 and from the service recommendation database 158 in the provider computing system 108.

View more button 520 may be selected to scroll the recommendations provided view 500 down to view more provided recommendations.

FIG. 6 shows a user interface 600 displayed on display 134 of user mobile device 104. User interface 600 may be a lock screen, home screen, or other graphical view configured to be overlaid by push notification 602. The provider computer system 108 and/or the user voice assistant 102 are configured to send a notification to the user mobile device 104 to trigger the presentation of push notification 602 when a recommendation for the user is available (e.g., at step 226 of FIG. 2B or step 310 of FIG. 3). The push notification 602 includes the name of the recommended provider and the name of the service the recommended provider provides, as well as contact button 604, learn more button 606, and close button 608.

Contact button 604 is configured to facilitate a user's effort to contact the recommended provider. When a user selects contact button 604, in some embodiments the telephone number for the recommended provider is sent to a phone call application on the mobile device 104 and a phone call to the provider is initiated. In other embodiments, an email or other text entry field addressed to an email address, phone number, or other inbox of the provider is launched in response to selection of the contact button 604.

Learn more button 606 is configured to launch a learn more interface in response to being selected (e.g., tapped on the touchscreen of display 134) by a user. According to various embodiments, the learn more interface includes recommendation information including the name of the recommender(s), the content of the recommendations, the basis for providing the recommendation (e.g., the user's statement that was interpreted as a request for a recommendation), the contact information of the recommended provider, the provider's location, the recommender's location, the provider's availability/schedule, and/or the provider's cost/pricing.

Close button 608 can be selected to dismiss push notification 602 and remove the push notification 602 from the user interface 600. The recommendation included in push notification 602 can still be accessed by the user, for example by viewing recommendations received view 500 as in FIG. 5 or by asking the user voice assistant 102 for the recommendation.

The embodiments described herein have been described with reference to drawings. The drawings illustrate certain details of specific embodiments that implement the systems, methods and programs described herein. However, describing the embodiments with drawings should not be construed as imposing on the disclosure any limitations present in the drawings.

It should be understood that no claim element herein is to be construed under the provisions of 35 U.S.C. § 112(f), unless the element is expressly recited using the phrase "means for."

As used herein, in various embodiments, the term "circuit" includes hardware structured to execute the functions described herein. In some embodiments, each respective "circuit" includes machine-readable media for configuring the hardware to execute the functions described herein. The circuit is embodied as one or more circuitry components including, but not limited to, processing circuitry, network interfaces, peripheral devices, input devices, output devices, sensors, etc. In some embodiments, a circuit takes the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" includes any type of component for accomplishing or facilitating achievement of the operations described herein. In one example, a circuit as described herein includes one or more transistors, logic gates (e.g., NAND, AND, NOR, OR, XOR, NOT, or XNOR), resistors, multiplexers, registers, capacitors, inductors, diodes, wiring, and so on.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, etc. In some embodiments, the one or more processors are external to the apparatus, for example, the one or more processors are a remote processor (e.g., a cloud based processor). Alternatively, or additionally, the one or more processors are internal and/or local to the apparatus. Accordingly, an exemplary system for implementing the overall system or portions of the embodiments might include a general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), etc. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, etc. In some embodiments, the volatile storage media takes the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, the network interface includes cryptography capabilities to establish a secure or relatively secure communication session between the device including the network interface and other devices of the system 100 via the network 110. In this regard, personal information about clients, financial data, and other types of data is encrypted and transmitted to prevent or substantially prevent the threat of hacking.

In certain embodiments, an "input/output circuit" as used herein includes hardware and associated logics configured to enable a party to exchange information with a computing device to which the input/output circuit is connected. In various embodiments, an input aspect of an input/output circuit allows a user to provide information to the computing device and includes, for example, a touchscreen, a mouse, a keypad, a camera, a scanner, a fingerprint scanner, an eye scanner, a sensor that detects movement, a microphone, a joystick, a user input device engageable to the computing device via a USB, wirelessly, and so on, or any other type of input device capable of being used with a computing device. In various embodiments, an output aspect of an input/output circuit allows a party to receive information from the computing device and includes, for example, a display, a printer, a speaker, illuminating icons, LEDs, an output device engageable to the computing device via a USB, wirelessly, and so on, or any other type of output device capable of being used with a computing device.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein show a specific order and composition of method steps, it is understood that in various embodiments the order of these steps differs from what is depicted. As an example, two or more steps are performed concurrently or with partial concurrence. Also, in various embodiments, some method steps that are performed as discrete steps are combined, steps being performed as a combined step are separated into discrete steps, the sequence of certain processes is reversed or otherwise varied, and/or the nature or number of discrete processes is altered or varied. Furthermore, the order or sequence of any element or apparatus is varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or as acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions can be made to the design, operating conditions and arrangement of the embodiments without departing from the scope of the present disclosure as expressed in the appended claims.

What is claimed is:

1. A provider computing system, comprising:
a service recommendation database configured to retrievably store recommendation information;
a network interface including hardware configured to communicate data over a network; and
a processing circuit comprising a processor and a memory, the memory structured to store instructions that are executable by the processor and cause the processing circuit to:
receive a first set of recommendation information from a local voice assistant device of a first user, the first set of recommendation information derived from a first set of voice data received by a voice recognition circuit of the local voice assistant device from the first user, the first set of recommendation information including an implicit recommendation derived implicitly from the first set of voice data by a services assessment circuit of the local voice assistant device based on a recognized statement related to a quality of a service, the implicit recommendation being an implicit recommendation made by the first user associated with the local voice assistant device that the first user was unaware that the local voice assistant device overheard, the implicit recommendation relating to the quality of the service;
store the first set of recommendation information in the service recommendation database;
subsequent to storing the first set of recommendation information in the service recommendation database, receive a request to generate a recommendation from a user voice assistant device of a second user, the request derived from a second set of voice data received by the user voice assistant device from the second user, and wherein the local voice assistant device and the user voice assistant device are two different devices;
in response to the request to generate the recommendation, identify the implicit recommendation based on a trusted relationship between the first user and the second user and request criteria of the request matching the implicit recommendation;
generate the recommendation for the second user based on the implicit recommendation made by the first user; and
transmit the recommendation to the user voice assistant device.

2. The system of claim 1, the processing circuit further caused to derive the first set of recommendation information from the first set of voice data by transcribing the first set of voice data to generate transcribed voice data and extracting the first set of recommendation information from the transcribed voice data.

3. The system of claim 1, the processing circuit further caused to derive the request from the second set of voice data by transcribing the second set of voice data to generate transcribed voice data and extracting the request from the transcribed voice data.

4. The system of claim 1, wherein the first set of recommendation information includes a name of a suggested service provider and a category of service type provided by the suggested service provider.

5. The system of claim 1, wherein the request comprises request criteria that specify a category of service type for which the request is requesting the recommendation.

6. The system of claim 1, the processing circuit further caused to receive additional voice data from a plurality of additional local voice assistant devices, each additional local voice assistant device located within a neighborhood of the user voice assistant device.

7. The system of claim 6, wherein the neighborhood is determined by at least one of a preset distance, a user-selectable distance, a school district, a school assignment zone, a voting district, a city, a county, or a geological feature.

8. A method, comprising:
receiving, by a provider computing system, a first set of recommendation information from a local voice assistant device of a first user, the first set of recommendation information derived from a first set of voice data received by a voice recognition circuit of the local voice assistant device from the first user, the first set of recommendation information including an implicit recommendation derived implicitly from the first set of voice data by a services assessment circuit of the local voice assistant device based on a recognized statement related to a quality of a service, the implicit recommendation being an implicit recommendation made by the first user associated with the local voice assistant device that the first user was unaware that the local voice assistant device overheard, the implicit recommendation relating to the quality of the service;

storing, by the provider computing system, the first set of recommendation information in a service recommendation database;

subsequent to storing the first set of recommendation information in the service recommendation database, receiving, by the provider computing system, a request to generate a recommendation from a user voice assistant device of a second user, the request derived from a second set of voice data received by the user voice assistant device from the second user, and wherein the local voice assistant device and the user voice assistant device are two different devices;

in response to the request to generate the recommendation, identifying, by the provider computing system, the implicit recommendation based on a trusted relationship between the first user and the second user and request criteria of the request matching the implicit recommendation;

generating, by the provider computing system, the recommendation for the second user based on the implicit recommendation made by the first user; and transmitting, by the provider computing system, the recommendation to the user voice assistant device.

9. The method of claim 8, wherein the method further comprises deriving the first set of recommendation information from the first set of voice data by transcribing the first set of voice data to generate transcribed voice data and extracting the first set of recommendation information from the transcribed voice data.

10. The method of claim 8, wherein the method further comprises deriving the request from the second set of voice data by transcribing the second set of voice data to generate transcribed voice data and extracting the request from the transcribed voice data.

11. The method of claim 8, wherein the first set of recommendation information includes a name of a suggested service provider and a category of service type provided by the suggested service provider.

12. The method of claim 8, wherein the request comprises request criteria that specify a category of service type for which the request is requesting the recommendation.

13. The method of claim 8, further comprising:
generating, by the provider computing system, a notification that includes the recommendation; and
transmitting, by the provider computing system, the notification to a mobile device.

14. The method of claim 8, further comprising:
generating, by the provider computing system, a graphical user interface that includes the recommendation; and
transmitting, by the provider computing system, the graphical user interface to the user voice assistant device for display on a display of the user voice assistant device.

15. A user voice assistant device, comprising:
an input/output circuit configured to record a first set of voice data spoken by a first user in proximity to the user voice assistant device;
a network interface; and
a processing circuit comprising a processor and a memory, the memory structured to store instructions that are executable by the processor and cause the processing circuit to:
store a set of recommendation information in a service recommendation database;
subsequent to storing the set of recommendation information in the service recommendation database, receive the first set of voice data from the first user via the input/output circuit;
determine whether the first set of voice data includes a request for a recommendation; and
in response to a determination that the first set of voice data includes the request for the recommendation:
send the request to a provider computing system;
receive the recommendation from the provider computing system; and
provide the recommendation to the input/output circuit to be presented to the first user;
wherein the recommendation is generated based on the set of recommendation information from a local voice assistant of a second user, the set of recommendation information derived from a second set of voice data received by a voice recognition circuit of the local voice assistant device from the second user, the set of recommendation information including an implicit recommendation derived implicitly from the second set of voice data by a services assessment circuit of the local voice assistant device based on a recognized statement related to a quality of a service, the implicit recommendation being an implicit recommendation made by the second user that the second user was unaware that the local voice assistant device overheard, the implicit recommendation relating to the quality of the service and identified based on a trusted relationship between the first user and the second user and request criteria of the request matching the implicit recommendation, and wherein the user voice assistant device and the one or more local voice assistant devices are different devices.

16. The user voice assistant device of claim 15, wherein the instructions further cause the processing circuit to:
in response to a determination that the first set of voice data does not include the request for the recommendation, determine whether the first set of voice data includes user recommendation information; and
in response to a determination that the first set of voice data includes the user recommendation information, provide the user recommendation information to the provider computing system.

17. The user voice assistant device of claim 15, wherein the input/output circuit comprises a microphone configured to record the first set of voice data and a speaker configured to present the recommendation to the first user by simulating the sound of a voice stating the recommendation.

18. The user voice assistant device of claim 15, wherein the recommendation includes a suggested service provider, wherein the network interface is configured to generate a communication session between the user voice assistant device and a service provider voice assistant to facilitate communication between the first user and the suggested service provider.

* * * * *